United States Patent
Oxley et al.

(10) Patent No.: US 7,144,068 B2
(45) Date of Patent: Dec. 5, 2006

(54) DRIVE MECHANISM FOR SELECTIVELY OPENING AND CLOSING A CLOSURE PANEL MANUALLY OR AUTOMATICALLY

(75) Inventors: Peter Lance Oxley, Mount Albert (CA); Peter Lejbjuk, Toronto (CA); Thomas Dean, Toronto (CA)

(73) Assignee: Intier Automotive Closures Inc., Newmarket (CA)

( * ) Notice: Subject to any disclaimer, the term of this patent is extended or adjusted under 35 U.S.C. 154(b) by 103 days.

(21) Appl. No.: 10/994,046

(22) Filed: Nov. 19, 2004

(65) Prior Publication Data

US 2005/0110300 A1 May 26, 2005

(51) Int. Cl.
B60J 5/06 (2006.01)

(52) U.S. Cl. .................................... 296/155
(58) Field of Classification Search ............... 296/155; 475/3–5, 270; 49/360, 139, 140; 74/29, 74/33, 30, 89.16, 625
See application file for complete search history.

(56) References Cited

U.S. PATENT DOCUMENTS

| | | | |
|---|---|---|---|
| 4,612,729 A * | 9/1986 | Sato .......................... | 49/362 |
| 4,862,640 A | 9/1989 | Boyko et al. | |
| 4,984,385 A | 1/1991 | DeLand | |
| 5,025,591 A | 6/1991 | DeLand et al. | |
| 5,062,241 A | 11/1991 | DeLand | |
| 5,063,710 A | 11/1991 | Schap | |
| 5,082,472 A * | 1/1992 | Mallouk et al. ............... | 95/49 |
| 5,105,131 A | 4/1992 | Schap | |
| 5,140,316 A | 8/1992 | DeLand et al. | |
| 5,168,666 A | 12/1992 | Koura et al. | |
| 5,203,112 A | 4/1993 | Yamagishi et al. | |
| 5,216,838 A | 6/1993 | DeLand et al. | |
| 5,434,487 A | 7/1995 | Long et al. | |
| 5,536,061 A | 7/1996 | Moore et al. | |
| 5,551,190 A | 9/1996 | Yamagishi | |
| 5,644,869 A | 7/1997 | Buchanan, Jr. | |
| 6,079,767 A | 6/2000 | Faubert et al. | |
| 6,100,619 A | 8/2000 | Buscher et al. | |
| 6,125,583 A * | 10/2000 | Murray et al. ................. | 49/291 |
| 6,198,242 B1 | 3/2001 | Yokomori et al. | |
| 6,276,743 B1 * | 8/2001 | Jyawook et al. ............ | 296/155 |
| 6,321,488 B1 * | 11/2001 | Bigoszewski et al. ........ | 49/358 |
| 6,321,489 B1 | 11/2001 | Murofushi et al. | |
| 6,422,615 B1 | 7/2002 | Roos et al. | |
| 6,435,600 B1 | 8/2002 | Long et al. | |
| 6,460,295 B1 | 10/2002 | Johnson et al. | |
| 6,464,287 B1 | 10/2002 | Rogers, Jr. et al. | |
| 6,481,783 B1 | 11/2002 | Rogers, Jr. et al. | |
| 6,530,619 B1 | 3/2003 | Fukumoto et al. | |
| 6,539,670 B1 | 4/2003 | Haag et al. | |

(Continued)

*Primary Examiner*—H Gutman
(74) *Attorney, Agent, or Firm*—Clark Hill PLC

(57) ABSTRACT

A drive mechanism assembly for enabling driving and manual movement of a sliding side door. The assembly has a track assembly mounted to a vehicle body at a predetermined height and a drive mechanism mounted to the sliding side door so as to be proximate to a door latching mechanism. The drive mechanism has an input drive motor driving an output gear assembly engaging the track assembly and a transmission gear assembly with a sliding gear which selectively couples the input drive motor and an input gear assembly to the output gear assembly between an engaged position for driving movement or disengaged position for manual movement of the sliding side door. In this way, the slide side door may be moved manually between open and closed positions without having to overcome the effort required of rotating the drive motor.

11 Claims, 4 Drawing Sheets

U.S. PATENT DOCUMENTS 6,575,864 B1    6/2003   Dean
6,588,829 B1    7/2003   Long et al.
6,659,539 B1   12/2003   Yogo et al.
6,701,671 B1    3/2004   Fukumoto et al.

2002/0043818 A1    4/2002   Fukumoto et al.
2003/0089042 A1    5/2003   Oberheide et al.
2003/0189196 A1   10/2003   Kita

* cited by examiner

DRIVE MECHANISM FOR SELECTIVELY OPENING AND CLOSING A CLOSURE PANEL MANUALLY OR AUTOMATICALLY

TECHNICAL FIELD

This invention relates to an improved drive mechanism for opening and closing a closure panel. In particular, this invention relates to a drive mechanism for a sliding minivan door or the like.

BACKGROUND ART

Conventional systems for automatically opening and closing a sliding door in a vehicle include a power drive assembly for moving the door so that the door can be moved between a fully closed position and a fully open position. Examples of such systems are described in WO 97/44559; and U.S. Pat. Nos. 6,481,783; 6,464,287; 5,644,869; 5,536,061; 5,434,487; 5,203,112; and 5,168,666.

In several of the examples of power sliding doors of the prior art, the drive assembly remains engaged even when the power is not activated. Thus when an operator wishes to manually open or close the door, the operator must overcome the drag produced by the drive assembly. In moving the door with the drive assembly engaged, the motor must be rotated in addition to all of the gears or other hardware of the drive assembly. This can make manually opening and/or closing of the door difficult to achieve due to the increased force required to move and/or rotate the drive components.

Additional problems exist with prior art door openers. For example, many door opening mechanisms include a gear rack which the drive acts against. While such systems work well, they can suffer from disadvantages in that the rack is typically visible to individuals outside the vehicle and can be unsightly and the rack must be provided with a lubricant that can attract and retain dirt and other contaminates which can adversely affect operation of the opening mechanism over time.

U.S. Pat. Nos. 6,481,783 and 6,464,287 show an opening system which employs a form of chain drive rather than a rack. U.S. Pat. No. 5,168,666 shows an opening system which employs an endless belt having a portion to which the door is attached. Other systems employ a cable which is attached to the door and moved my the drive mechanism.

All of these prior art systems suffer from disadvantages and/or problems including, the weight of the mechanisms, their complexity, a resultant poor aesthetic appearance and/or the reliability of the mechanism over time.

SUMMARY OF THE INVENTION

At least some of the disadvantages of the prior art may be overcome by providing a drive assembly for opening and closing a closure panel, wherein the drive assembly has a simple mechanism for engaging the drive effecting powered movement of the closure panel and for disengaging the drive effecting low effort manual movement of the closure panel.

In accordance with an embodiment of the invention, there is provided a drive assembly for driving and manual movement of a sliding side door between open and closed positions on a vehicle body, the drive assembly having a track assembly mounted to the vehicle body and a drive mechanism mounted to the sliding side door and operatively engaging the track assembly, the drive mechanism having an input drive motor driving an output gear assembly for engaging the track assembly characterized by the input drive motor being coupled to an input gear assembly, and a transmission gear assembly having a sliding gear which is selectively movable axially along a pin between an engaged position coupling the input gear assembly to the output gear assembly for driving movement of the sliding side door and a disengaged position where the output gear assembly is disengaged from the input drive motor for manual movement of the sliding side door, the track assembly including a belt extending along the track assembly, the ends of the belt being fixed to the track assembly and wherein the output gear assembly includes a belt drive pulley to engage the belt.

In one embodiment, the track assembly includes a toothed flexible belt which is engaged by an output pulley.

The invention also provides for the transmission gear assembly to include an actuator motor, a gear train coupled to the actuator motor and engaging a lever pivotally connected for selectively moving the sliding gear between an engaged and a disengaged position.

In a preferred embodiment of the invention, the lever has three arms respectively coupled to the gear train, sliding gear, and a disengagement cable coupled to a latch release handle of the sliding side door so that the sliding gear is disengaged when a door latch is manually released.

In accordance with another aspect of the invention, the track assembly is mounted to the vehicle body at a predetermined height and the drive mechanism is mounted to the sliding side door so as to be proximate to the door latching mechanism.

DESCRIPTION OF THE DRAWINGS

In drawings which illustrate an embodiment of the invention.

DETAILED DESCRIPTION OF THE INVENTION

Figure 1:
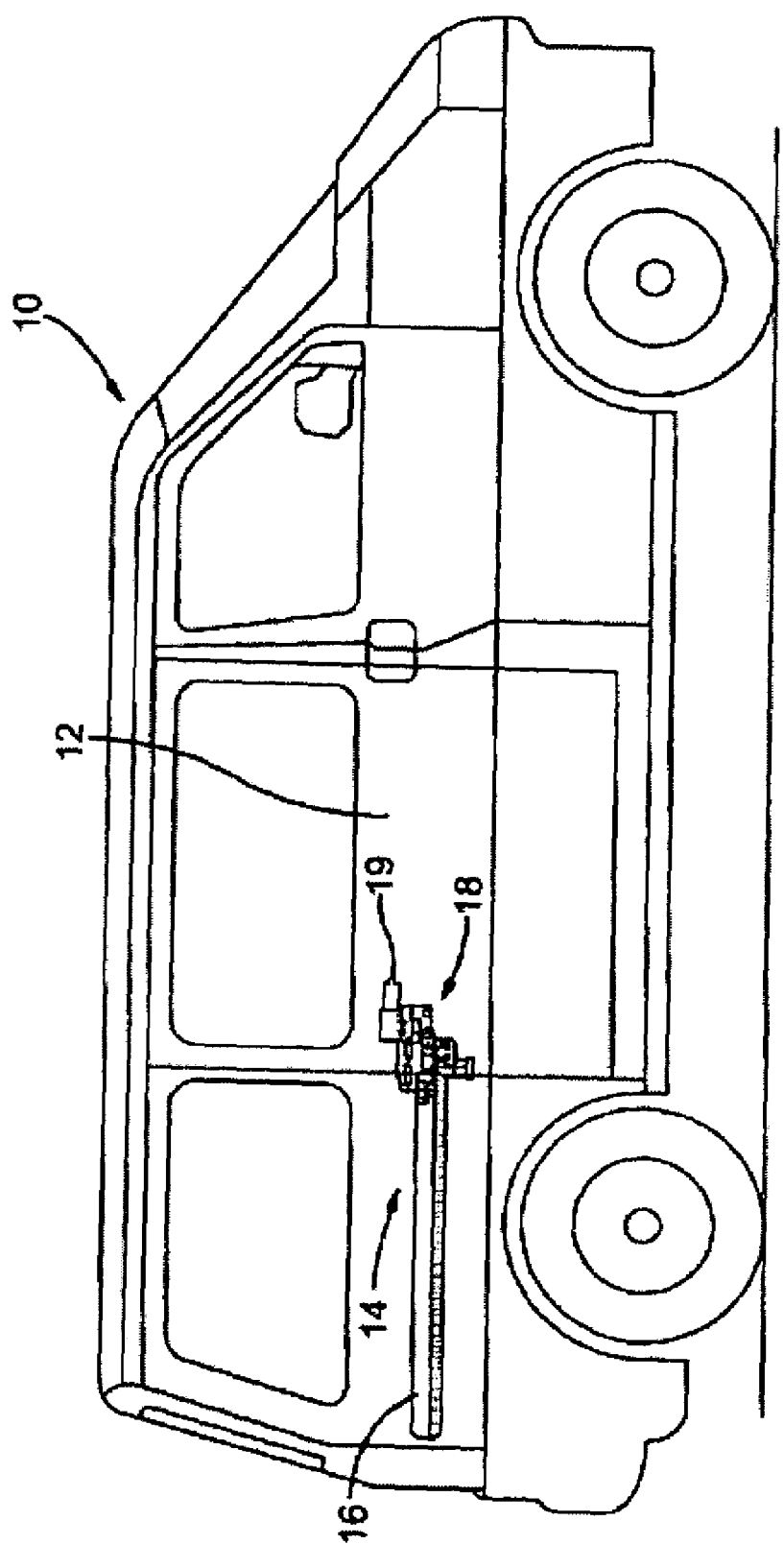
FIG. 1 is a side elevational view of a minivan incorporating the drive assembly of the present invention.

Referring to FIG. 1, there is illustrated a vehicle body 10 having a sliding side door 12. Sliding door 12 is conventionally mounted to the side of the vehicle 10 on suitable tracks for guided movement between a closed position wherein the door is substantially flush with the exterior surface of the vehicle 10 and an open position wherein the passengers of the vehicle 10 may pass. Although the right side of the vehicle is illustrated in the present embodiment, it is readily understood by those skilled in the art that the present invention applies equally to a left side sliding door.

The sliding side door 12 has a drive assembly 14 mounted between the body of the vehicle 10 and the sliding side door 12 for driving and manual movement of the sliding side door 12 between the open and closed positions. The drive assembly 14 generally comprises a track assembly 16 and a drive mechanism 18. The track assembly 16 is integrated in the rear quarter panel of the vehicle 10 and comprises a rack which extends generally in a longitudinal direction at a predetermined height above the wheel well. The drive mechanism 18 is mounted in the sliding side door 12 on the trailing edge of the door adjacent to a door latching mechanism 19 and operably engages the track assembly 16.

Figure 2:
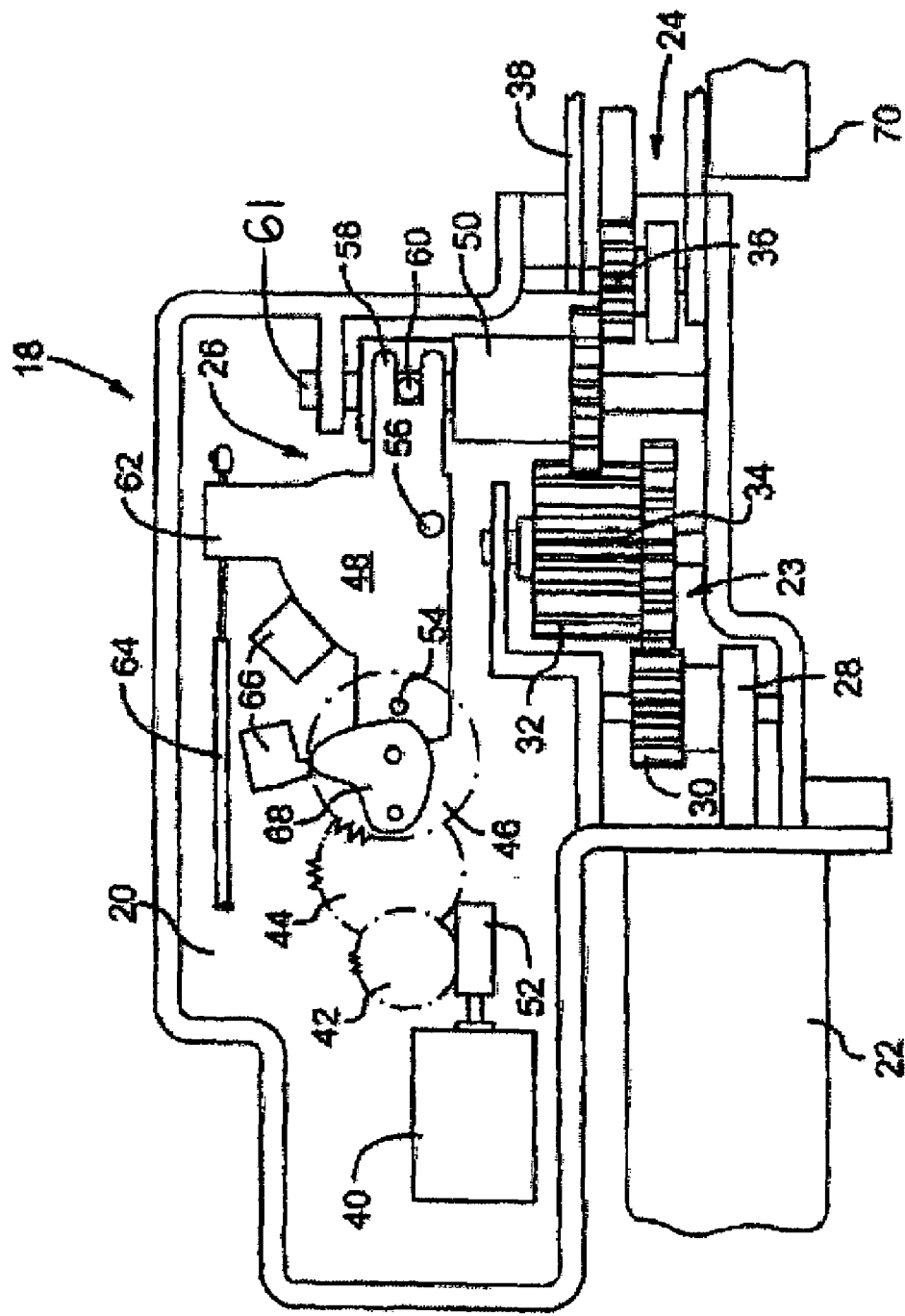
FIG. 2 is a side elevational view of a drive mechanism of the drive assembly of FIG. 1.

Referring to FIG. 2, drive mechanism 18 is illustrated in greater detail. Drive mechanism 18 has a housing 20 on which various input drive components are mounted. The drive mechanism 18 generally comprises an input drive motor 22, an input gear assembly 23, an output gear assembly 24 and a transmission gear assembly 26.

Input drive motor 22 is mounted to the housing 20 such that its drive shaft extends into the housing 20. Drive motor 22 is electrically connected to a source of electricity for driving in both a forward and rearward direction. A worm gear 28 is mounted on the drive shaft of drive motor 22.

Input gear assembly 23 comprises a pair of reduction gears 30 and 32. Each reduction gear 30, 32 is rotatably mounted to the housing 20. Reduction gear 30 drivingly engages with worm gear 28 and with reduction gear 32. Reduction gear 32 has an extended barrel portion having elongate teeth 34.

Output gear assembly 24 has a pinion gear 36 rotatably mounted to a hinge bracket 38. The hinge bracket 38 is coupled to the housing 20 and is operably connected with the track assembly 16.

Transmission gear assembly 26 generally comprises an actuator motor 40, a series of reduction gears 42, 44, 46, a lever 48 and a sliding gear 50. Actuator motor 40 is in driving engagement with the reduction gear 42. The actuator motor 40 has a worm gear 52 which drives reduction gear 42 which responsively drives reduction gears 44 and 46. Reduction gear 46 has a pin 54 which slidingly engages a first arm of the lever 48. The lever 48 is pivotally mounted to the housing 20 at pin 56. On a second arm opposite to the pinned connection with the reduction gear 46, the lever 48 has a fork 58 for slidingly engaging pin 60. Pin 60 extends radially from sliding gear 50. Sliding gear 50 is rotatably and slidably mounted on pin 61. The teeth of gears 50 and 36 preferably have rounded ends; rounded tooth ends allow the sliding gear 50 to smoothly re-engage with pinion gear 36 and reduction gear 34.

As is apparent, when actuator 40 rotates in a disengaging sense, lever 48 will responsively pivot about pin 56 such that sliding gear 50 will slide out of engagement with output pinion gear 36. When actuator motor 40 rotates in an opposite or engaging sense, lever 48 will responsively pivot about pin 56 such that sliding gear 50 will slide into engagement with output pinion gear 36.

Lever 48 has a third arm 62 which engages a disengagement cable in the form of a Bowden wire 64. Bowden wire 64 is operably connected with inner and outer latch release handles (not shown) of the sliding side door 12 and forming part of the latching mechanism 19. Operation of the latch release handles will responsively effect rotation of the lever 48 in a disengaging sense, moving the sliding gear 50 out of engagement with the output pinion gear 36 in the output drive gear assembly 24.

Additionally, housing 20 can have a series of switches 66 which are positioned to engage lever 48 and an L-shaped lever 68 fitted on gear 46. Switches 66 generate on and off signals to indicate the state or position of the lever 48 thereby signaling whether the sliding gear 50 is engaged so that the drive mechanism 18 may be operated safely and without undue strain on the gear assemblies 23, 24, 26.

Desirably, the drive mechanism 18 is associated with an encoder 70 which is mounted to the hinge bracket 38 so as to be as close as possible to the track assembly 16. The encoder 70 is coupled to the pinion gear 36 of the output gear assembly 24 and is adapted to signal the relative position of the sliding side door 12 to the track assembly 16 and the velocity at which the sliding side door 12 is traveling. The signals are transmitted to a programmed logic controller (PLC) so that the input drive motor 22 will stop and reverse if an obstacle, such as a body part, is encountered. The input drive motor 22 will also slow down for the last 200 mm of track when the sliding side door 12 is moved to a closed position. Further, the time and travel allowed between contacting an obstacle and reaching a maximum allowable pinch force may be adjusted in accordance with motor vehicle safety standards and optimized to compensate for wear in the gears over time.

Figure 3:
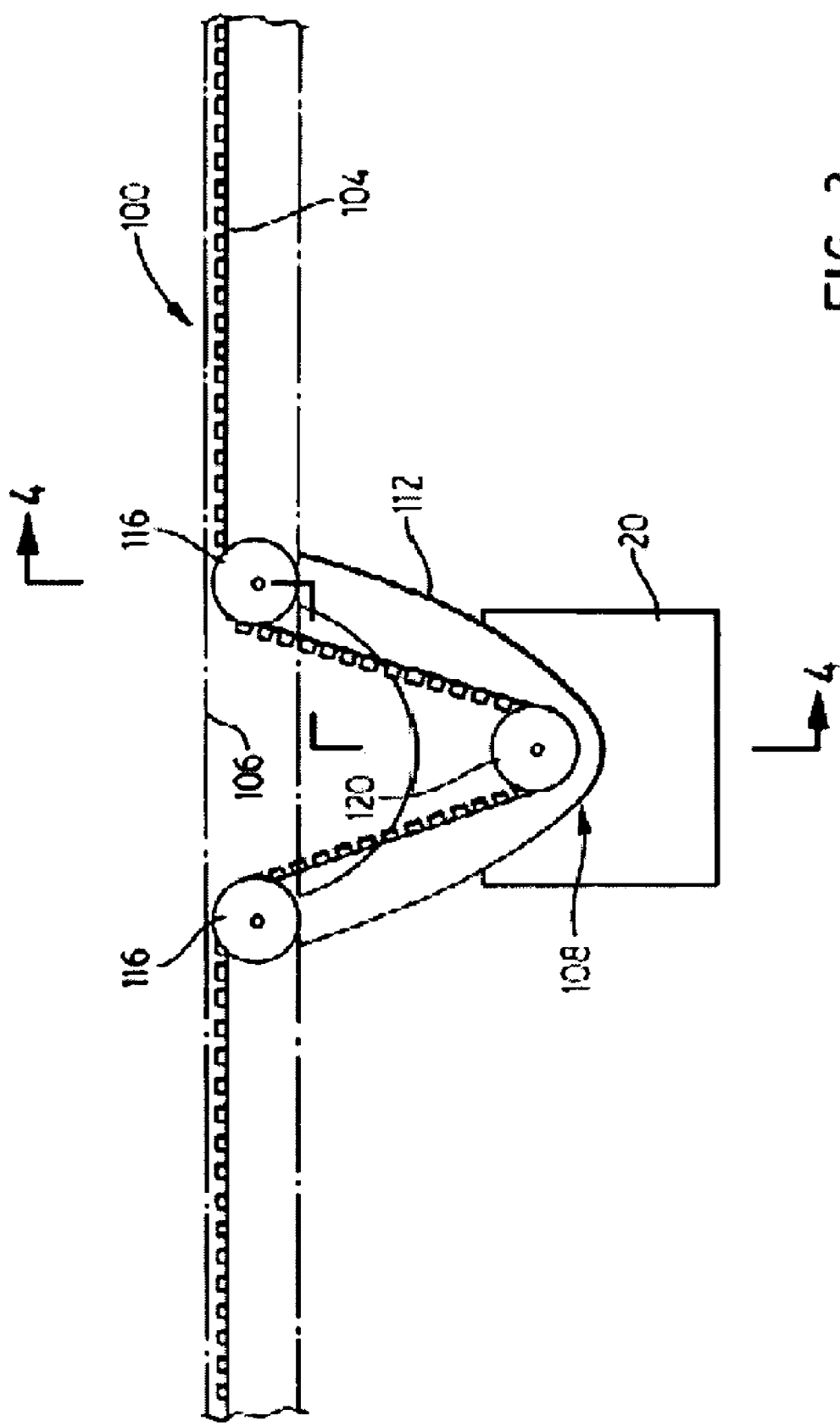
FIG. 3 shows a top view of another embodiment of a drive mechanism in accordance with the present invention.
Figure 4:
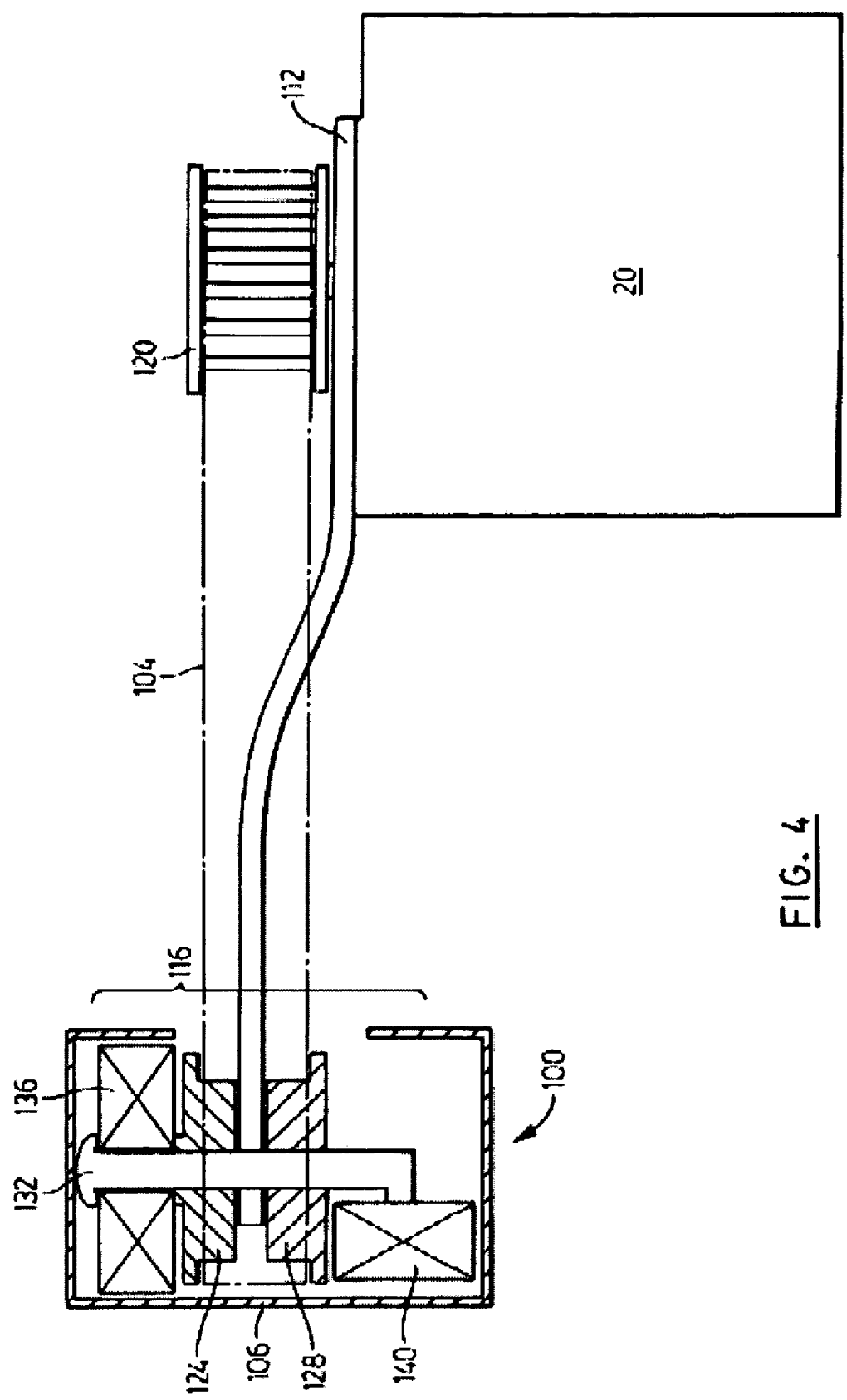
FIG. 4 shows a section of the embodiment of FIG. 3, taken through line 4—4.

FIGS. 3 and 4 show another embodiment of the invention and like components in FIGS. 3 and 4 to those of FIGS. 1 and 2 are indicated with like reference numerals. In FIG. 3, a track assembly 100 is shown in dashed line and it is shown in solid line in FIG. 4. Track assembly 100 differs from track assembly 16, described above, in that it does not include a rack to be engaged by a pinion gear 36. Instead, track assembly 100 includes a belt 104 (shown in solid line in FIG. 3 and dashed line in FIG. 4) which is fixed, at its ends (not shown), to track assembly 100. Belt 104 can be any suitable belt including rubber belts with Kevlar or other reinforcements and in a presently preferred embodiment is a Kevlar reinforced toothed belt similar to the endless toothed belts used on automotive engines for valve timing, etc. which can carry relatively large tensile loads and which are not generally subject to stretching.

As mentioned above, belt 104 is preferably toothed and is attached to track assembly 100 at each of its ends such that the teeth are adjacent to the interior wall 106 of track assembly 100 and the length of belt 104 is selected to provide an amount of slack, allowing belt 104 to engage a drive gear assembly 108.

As shown in FIGS. 3 and 4, drive gear assembly 108 comprises a bracket 112 fixed to housing 20 and to which a pair of idler and bearing assemblies 116 are mounted and, in this embodiment, pinion gear 36 is replaced by belt driver pulley 120. Belt driver pulley 120 includes a pulley portion of complementary shape to belt 104 such that it engages the teeth of belt 104 and a gear portion of complementary shape to sliding gear 50 such that pulley 120 can be driven by sliding gear 50 in a manner similar to that described herein with respect to pinion gear 36 and belt driver pulley 120 will, in turn, be driven along belt 104.

As best seen in FIG. 4, each of idler and bearing assemblies 116 includes upper pulley 124 and lower pulley 128 halves which are mounted to bracket 112 by pin 132. Upper and lower pulley halves 124,128 rotate about pin 132 and engage the non-toothed side of belt 104. A first bearing 136 is provided on pin 132 above upper pulley half 124 and acts against track assembly 100 to carry horizontal loads. A second bearing 140 is also provided on pin 132 below lower pulley half 128 and acts against track assembly 100 to carry vertical loads. If desired, a separate pin (not shown) can be provided on bracket 112 and second bearing 140 can be mounted on this second pin, instead of on pin 132. In this manner, pin 132 can be straight, allowing for easier fabrication and/or manufacture. First bearing 136 and second bearing 140 can be any suitable bearings such as Delrin™ rollers, roller bearings, etc.

This embodiment of the present invention avoids the expense of fabricating a rack for inclusion in track assembly 100 and avoids possible problems with contaminants, such as dirt, affecting engagement of pinion gear 36 with the rack. Further, as belt 104 is mounted with the teeth adjacent to back wall 106, only the outer, smooth side, of belt 104 is visible to observers and it is believed that this is much more aesthetically pleasing. In fact, it is contemplated that belt 104 can be colored to match the color of the surrounding body work of the vehicle for an even more aesthetically pleasing result.

In use, a controller will cause actuator motor 40 to rotate in an engaging sense. Lever 48 will responsively pivot, urging the sliding gear 50 to slide into engagement with the output pinion gear 36, or belt driver pulley 120, thereby effecting a driving connection between the drive motor 22 and the output gear assembly 24. Rotation of the drive motor 22 will effect the opening and closing movement of the sliding door 12.

For manual opening and closing of the sliding door 12, the latch release handles are manipulated effecting a pull on Bowden wire 64. The lever 48 responsively rotates in a disengaging sense urging the sliding gear 50 to become disengaged from output pinion gear 36, or belt driver pulley 120. The door may then be moved manually between the open and closed positions without having to overcome the effort of rotating the drive motor 22.

On the other hand, upon releasing the latch release handles, and moving the door to a fully open position, actuator motor 40 operates to restore lever 48 to an actuating position (as drawn) where sliding gear 50 engages pinion gear 36 or belt driver pulley 120. In this way, the drive assembly 14 will hold the sliding side door 12 in the position where the door has come to rest and the door will not travel under its own weight if the vehicle has, for example, been parked on an incline.

It will also be appreciated that positioning the track assembly 16 on the vehicle body at a height commensurate with the door latching mechanism 19 provides an enormous advantage over those door closing systems where the track assembly is integrated into the lower end of the door opening portion of a vehicle body. With such an arrangement, it is not uncommon for automatic door operating systems to include door moving means to bring a door to a so-called "half-latch" position and additional door closing means to bring the door to a fully closed position, each with respective electric motors to produce the required motive power. In accordance with this invention, no auxiliary motive power is required to bring the door to a fully closed position because the input drive motor 22 is proximate to the door latching mechanism 19.

The above-described embodiments of the invention are intended to be examples of the present invention and alterations and modifications may be effected thereto, by those of skill in the art, without departing from the scope of the invention. In particular, it will be appreciated that the nature and configuration of the input gear assembly 23, output gear assembly 24, and transmission gear assembly 26 may vary considerably in accordance with accepted design considerations.

The invention claimed is:

1. A drive assembly for driving and manual movement of a sliding side door between open and closed positions on a vehicle body, the drive assembly having a track assembly mounted to the vehicle body and a drive mechanism mounted to the sliding side door and operatively engaging the track assembly, the drive mechanism having an input drive motor driving an output gear assembly for engaging the track assembly characterized by the input drive motor being coupled to an input gear assembly, and a transmission gear assembly having a sliding gear which is selectively movable axially along a pin between an engaged position coupling the input gear assembly to the output gear assembly for driving movement of the sliding side door and a disengaged position where the output gear assembly is disengaged from the input drive motor for manual movement of the sliding side door, the track assembly including a belt extending along the track assembly, the ends of the belt being fixed to the track assembly and wherein the output gear assembly includes a belt drive pulley to engage the belt.

2. A drive assembly according to claim 1 in which the transmission gear assembly includes an actuator motor, a gear train coupled to the actuator motor and engaging a lever pivotally connected for selectively moving the sliding gear between said engaged position and said disengaged position.

3. A drive mechanism assembly according to claim 2 in which the transmission gear assembly includes a disengagement cable coupled to a latch release handle of the sliding side door and adapted to pivot said lever so as to disengage the sliding gear from the input drive motor for manual movement of the sliding side door when a door latching mechanism is manually released.

4. A drive mechanism assembly according to claim 3 in which the disengagement cable is adapted to pivot said lever so as to engage the sliding gear to couple the input gear assembly to the output gear assembly and thereby arrest continued movement of the sliding side door when the latch release handle is released.

5. A drive mechanism assembly according to claim 2 in which the lever has three arms extending outwardly from a pivot for the lever respectively coupled to gear train, sliding gear and disengagement cable.

6. A drive mechanism assembly according to claim 1 having signaling means signaling whether the transmission gear assembly is in an engaged position or a disengaged position.

7. A drive mechanism assembly according to claim 1 in which the track assembly is mounted to the vehicle body at a predetermined height commensurate with a door latching mechanism and the input drive motor is proximate to said door latching mechanism.

8. A drive mechanism assembly according to claim 1 having an encoder mounted to a hinge bracket housing the output gear assembly and having signaling means for signaling the position and velocity of the sliding side door relative to said track assembly.

9. A drive mechanism assembly according to claim 1 wherein the surface of the belt facing the interior of the vehicle is toothed and the belt drive pulley has a complementary shape to engage the teeth of the belt.

10. A drive mechanism assembly according to claim 9 wherein the surface of the belt facing the exterior of the vehicle has a similar color to that of the exterior of the vehicle.

11. A drive mechanism assembly according to claim 9 wherein the belt is directed from the interior of the track assembly to the belt drive pulley by a pair of idler and bearing assemblies, each idler and bearing assembly including: a pulley to engage the belt comprising an upper pulley half and a lower pulley half separated by a mounting bracket and mounted thereto by a pin, a first bearing mounted to the pin and acting against the track assembly to bear horizontal forces applied through the drive mechanism and a second bearing mounted to the pin and acting against the track assembly to bear vertical forces applied through the drive mechanism.

* * * * *